US012452604B2

(12) United States Patent
Chen et al.

(10) Patent No.: US 12,452,604 B2
(45) Date of Patent: Oct. 21, 2025

(54) LOUDSPEAKER AND ELECTRONIC DEVICE

(71) Applicant: HUAWEI TECHNOLOGIES CO., LTD., Guangdong (CN)

(72) Inventors: Wenguang Chen, Dongguan (CN); Mingguang Guo, Dongguan (CN); Ling Tao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 18/175,767

(22) Filed: Feb. 28, 2023

(65) Prior Publication Data

US 2023/0232158 A1 Jul. 20, 2023

Related U.S. Application Data

(63) Continuation of application No. PCT/CN2021/102268, filed on Jun. 25, 2021.

(30) Foreign Application Priority Data

Sep. 1, 2020 (CN) ......................... 202010903510.5

(51) Int. Cl.

| | |
|---|---|
| ***H04R 9/04*** | (2006.01) |
| ***H04R 1/02*** | (2006.01) |
| ***H04R 7/12*** | (2006.01) |
| ***H04R 7/18*** | (2006.01) |

(Continued)

(52) U.S. Cl.

CPC ............. *H04R 9/043* (2013.01); *H04R 1/028* (2013.01); *H04R 7/12* (2013.01); *H04R 7/18* (2013.01); *H04R 9/025* (2013.01); *H04R 9/045* (2013.01); *H04R 9/06* (2013.01); *H04R 2400/11* (2013.01); *H04R 2499/15* (2013.01)

(58) Field of Classification Search

CPC .......... H04R 9/043; H04R 1/028; H04R 7/12; H04R 7/18; H04R 9/025; H04R 9/045; H04R 9/06; H04R 2400/11; H04R 2499/15

See application file for complete search history.

(56) References Cited

U.S. PATENT DOCUMENTS

2019/0364367 A1 11/2019 Lorenz et al.

FOREIGN PATENT DOCUMENTS

| | | |
|---|---|---|
| CN | 203120146 U | 8/2013 |
| CN | 105187997 A | 12/2015 |
| CN | 205793303 U | 12/2016 |

(Continued)

*Primary Examiner* — Andrew Sniezek

(57) ABSTRACT

This application relate to the field of electronic device technologies, and in particular, to a loudspeaker and an electronic device. Embodiments of this application are provided to resolve a technical problem of insufficient sensitivity of a loudspeaker caused by a small electromagnetic driving force that drives a voice coil to vibrate. According to a loudspeaker and an electronic device in embodiments of this application, a yoke includes a bottom part and a sleeve located on the side of the bottom part. An annular magnet is sleeved on the outer side of the sleeve. A voice coil is sleeved on the sleeve and located between the magnet and the sleeve. A damper is located in a region enclosed by the sleeve. An outer edge of the damper is connected to the voice coil, and a middle part of the damper is connected to the yoke.

16 Claims, 6 Drawing Sheets

(51) Int. Cl.
*H04R 9/02* (2006.01)
*H04R 9/06* (2006.01)

(56) References Cited

FOREIGN PATENT DOCUMENTS

| | | | | | |
|---|---|---|---|---|---|
| CN | 207518845 | U | | 6/2018 | |
| CN | 110366080 | A | | 10/2019 | |
| GB | 2480058 | A | * | 11/2011 | ............. H04R 9/043 |
| JP | 2008271341 | A | | 11/2008 | |
| WO | 2020126847 | A1 | | 6/2020 | |

* cited by examiner

LOUDSPEAKER AND ELECTRONIC DEVICE

CROSS-REFERENCE TO RELATED APPLICATIONS

This application is a continuation of International Application No. PCT/CN2021/102268, filed on Jun. 25, 2021, which claims priority to Chinese Patent Application No. 202010903510.5, filed on Sep. 1, 2020. The disclosures of the aforementioned applications are hereby incorporated by reference in their entireties.

TECHNICAL FIELD

Embodiments of this application relate to the field of electronic device technologies, and in particular, to a loudspeaker and an electronic device.

BACKGROUND

Loudspeakers are usually disposed on terminal devices such as televisions, displays, and tablet computers, to play a media sound. In a related technology, a loudspeaker includes a basket, a yoke, a magnet, a voice coil, and a damper. The basket encloses a region to form a groove. The yoke is arranged at a groove bottom of the groove. The yoke is columnar, and a tail end of the yoke is provided with a mounting groove. The magnet is arranged in the mounting groove. The voice coil is sleeved on the outer side of the yoke. The damper is annular. An inner wall of the damper is connected to the voice coil, and an outer wall of the damper is connected to the basket. During use, the voice coil is energized, so that the voice coil vibrates in a direction of a center line of the yoke, to generate a sound.

However, the damper limits the volume of the yoke and the length of the voice coil, which leads to a small electromagnetic driving force that drives the voice coil to vibrate, and insufficient sensitivity of the loudspeaker.

SUMMARY

In view of this, embodiments of this application provide a loudspeaker and an electronic device, to resolve a technical problem of insufficient sensitivity of a loudspeaker caused by a small electromagnetic driving force that drives the voice coil to vibrate.

An embodiment of this application provides a loudspeaker, including a yoke, a magnet, a voice coil, and a damper. The yoke includes a bottom part and a sleeve located on the side of the bottom part. The magnet is annular, and the magnet is sleeved on the outer side of the sleeve. The voice coil is sleeved on the outer side of the sleeve, and is located between the sleeve and the magnet. The damper is located in a region enclosed by the sleeve.

Through the foregoing arrangement, the damper is located in the region enclosed by the sleeve. An outer edge of the damper is connected to the voice coil, and a middle part of the damper is connected to the yoke. Both the magnet and the voice coil are located on an outer side of the damper. The volume of the magnet and the length of a coil in the voice coil are not affected by the damper. The volume of the magnet and the length of the coil in the voice coil can be set to be larger, so that an electromagnetic driving force that drives the voice coil to vibrate is increased, and sensitivity of the loudspeaker is improved.

In some embodiments, the yoke further includes a boss, and the boss is located in the region enclosed by the sleeve.

The middle part of the damper is attached to a surface that is of the boss and that is away from the bottom part.

In such an arrangement, an inner wall that is of the damper and that faces the bottom part is connected to the boss. In such an arrangement, the damper is connected to the bottom part by using the boss, and a distance between the damper and the bottom part can be increased, so that the damper can be located in a plane perpendicular to a central axis of the sleeve.

In some embodiments, the loudspeaker further includes a vibration diaphragm. An end face that is of the voice coil and that faces the vibration diaphragm is fixedly connected to a side that is of the vibration diaphragm and that faces the bottom part.

In some embodiments, the vibration diaphragm includes a main body and an extension part. The main body is annular, and the extension part is tubular. The extension part extends from an inner edge of the main body in a direction toward the bottom part. An outer edge of the damper is fixedly connected to an inner wall of the extension part.

In such an arrangement, the outer edge of the damper is connected to the voice coil through the extension part, and the extension part may extend into the sleeve, so that the height of the boss can be reduced, thereby reducing the mass of the loudspeaker.

In some embodiments, the loudspeaker further includes a support tube. The support tube is located between the damper and the voice coil, and is located in the region enclosed by the sleeve. The outer edge of the damper is fixedly connected to an inner side wall of the support tube, and the support tube is fixedly connected to the voice coil.

In some embodiments, both ends that are of the support tube and the voice coil and that are away from the bottom part are fixedly connected to the vibration diaphragm. Thus, the support tube and the voice coil are fastened to each other by using the vibration diaphragm.

In some embodiments, the loudspeaker further includes a dust cap. The dust cap covers a top part of a sleeve region. Both the support tube and the voice coil are fixedly connected to an inner wall of the dust cap.

In some embodiments, the inner wall of the dust cap is provided with a fastening ring. Both the support tube and the voice coil are connected to the fastening ring.

In such an arrangement, the voice coil and the support tube are connected to the dust cap by using the fastening ring. Uniformity of a force on the dust cap is improved. Moreover, connection between the voice coil and the support tube may be achieved by using the fastening ring.

In some embodiments, the loudspeaker further includes a pole piece. The pole piece is annular, and the pole piece covers a surface that is of the magnet and that faces away from the bottom part.

In such an arrangement, the pole piece may adjust a magnetic field generated by the magnet, so that magnetic field lines generated by the magnet are concentrated between an inner wall of the pole piece and the sleeve. Therefore, the strength of a magnetic field in which a coil is located is increased, an electromagnetic driving force that drives the voice coil to move is improved, and sensitivity of the loudspeaker is thus improved.

In some embodiments, an edge that is of the pole piece and that faces the voice coil protrudes from an edge that is of the magnet and that faces the voice coil. In such an arrangement, a distance between the pole piece and the sleeve is less than a distance between the magnet and the sleeve, to reduce a distance between the inner wall of the pole piece and the coil, so that the strength of the magnetic field in which the coil is located is further improved, and the electromagnetic driving force that drives the voice coil to move is further improved.

In some embodiments, the loudspeaker further includes a basket. The basket is provided with a groove. A groove bottom of the groove is provided with a fitting hole, and at least a part of the voice coil extends from the groove bottom of the groove through the fitting hole.

In some embodiments, an edge of the fitting hole is attached to an end face that is of the pole piece and that is away from the voice coil. The pole piece extends into the fitting hole to limit a relative position between the pole piece and the basket by using the fitting hole, thereby improving position precision between the pole piece and the basket.

In some embodiments, there are multiple dampers. The multiple dampers are stacked along a direction of a central axis of the sleeve, and every two adjacent dampers are separated from each other. In such an arrangement, the multiple dampers may improve resilience of the voice coil and further limit the position of the voice coil in an annular gap.

In some embodiments, the boss is provided with a plurality of fastening portions in a direction of a central axis of the sleeve, and each damper is fastened to one fastening portion. Such an arrangement allows each damper to be in a plane perpendicular to the central axis of the sleeve.

An embodiment of this application further provides an electronic device, including a housing and the loudspeaker described above, where the loudspeaker is located inside the housing.

According to the electronic device provided in this embodiment of this application, a yoke of the loudspeaker includes a bottom part and a sleeve located on the side of the bottom part. An annular magnet is sleeved on the outer side of the sleeve. A voice coil is sleeved on the sleeve, and is located between the magnet and the sleeve. The damper is located in a region enclosed by the sleeve. An outer edge of the damper is connected to the voice coil, and a middle part of the damper is connected to the yoke. Both the magnet and the voice coil are located on an outer side of the damper. The volume of the magnet and the length of a coil in the voice coil are not affected by the damper. The volume of the magnet and the length of the coil in the voice coil can be set to be larger, so that an electromagnetic driving force that drives the voice coil to vibrate is increased, and sensitivity of the loudspeaker is improved.

BRIEF DESCRIPTION OF DRAWINGS

To describe the technical solutions in embodiments of this application more clearly, the following briefly describes the accompanying drawings for describing embodiments or the prior art. It is clear that the accompanying drawings in the following description show some embodiments of this application, and a person of ordinary skill in the art may still derive other drawings from these accompanying drawings without creative efforts.

REFERENCE NUMERALS

1: loudspeaker;
2: housing;
10: basket;
20: yoke;
30: voice coil;
40: magnet;
50: damper;
60: vibration diaphragm;
70: pole piece
101: groove;
102: fitting hole;
201: sleeve;
202: bottom part;
203: boss;
204: annular gap;
205: alignment hole;
206: fastening portion;
301: coil;
302: tube body;
601: main body;
602: extension part;
603: support tube;
604: elastic surround;
605: fastening ring;
606: first annular groove;
607: second annular groove;
608: diffusion cavity; and
609: dust cap.

DESCRIPTION OF EMBODIMENTS

To make the objectives, technical solutions, and advantages of embodiments of this application clearer, the following clearly and describes the technical solutions in embodiments of this application with reference to the accompanying drawings in embodiments of this application. It is clear that the described embodiments are merely some rather than all of embodiments of this application. All other embodiments obtained by a person of ordinary skill in the art based on embodiments of this application without creative efforts shall fall within the protection scope of this application.

A loudspeaker includes a basket, a yoke, a magnet, a voice coil and a damper. The basket is provided with a groove. The yoke is arranged at a groove bottom of the groove. The yoke is provided with a mounting groove. The cylindrical magnet is arranged in the mounting groove. An annular gap is arranged between the magnet and the mounting groove. The voice coil is sleeved on the outer side of the magnet and is located in the annular gap. The damper is annular. An inner wall of the damper is connected to the voice coil, and an outer wall of the damper is connected to a side wall of the groove. During use, the voice coil is energized, so that the voice coil vibrates in a direction of a center line of the yoke, to generate a sound. In a process of voice coil vibration, the damper may provide resilience for the voice coil, so that the voice coil can perform reciprocating motion.

The damper is sleeved on the outer side of the magnet and the voice coil, and the damper limits the volume of the magnet and the length of a coil in the voice coil, which leads to a small electromagnetic driving force that drives the voice coil to vibrate, and insufficient sensitivity of the loudspeaker.

This embodiment provides an electronic device, including but not limited to a television, a mobile phone, a tablet computer, a notebook computer, an ultra-mobile personal computer (UMPC), a sound box, a headset, and the like.

Figure 1:
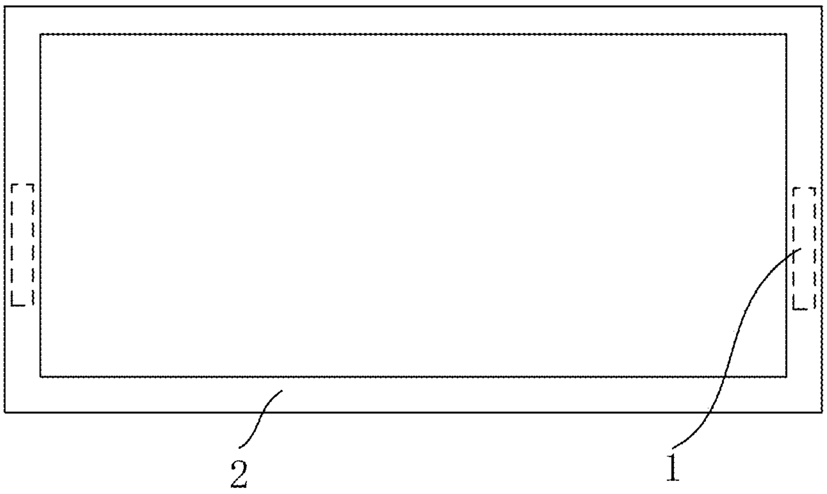
FIG. 1 is a schematic diagram of an electronic device according to an embodiment of this application.

As shown in FIG. 1, the electronic device provided in this embodiment includes a housing 2 and a loudspeaker 1. The loudspeaker 1 may be disposed inside the housing 2, so that the loudspeaker 1 plays a media sound when the electronic device works. Further, the electronic device may further include a display panel disposed on the housing 2. The display panel may be an organic light emitting diode display panel (LED), a liquid crystal display panel (LCD), or the like. When the display panel displays an image, the loudspeaker 1 may play a corresponding sound. The display panel may be disposed on a first surface of the housing 2. Correspondingly, the loudspeaker 1 may be disposed on the first surface and located on two sides of the display panel. Certainly, the loudspeaker 1 may alternatively be disposed on a second surface of the housing 2 opposite to the first surface.

Scenario 1

Figure 2:
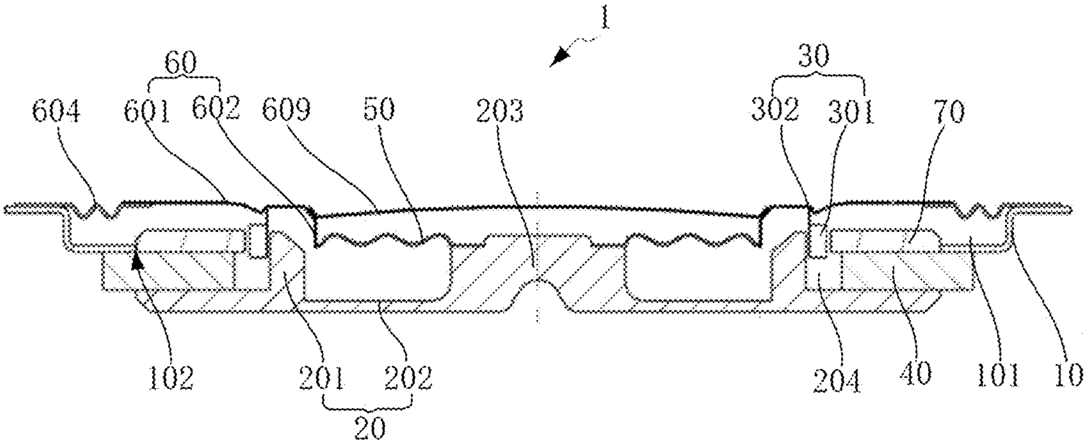
FIG. 2 is a schematic diagram 1 of a structure of a loudspeaker according to an embodiment of this application.
Figure 3:
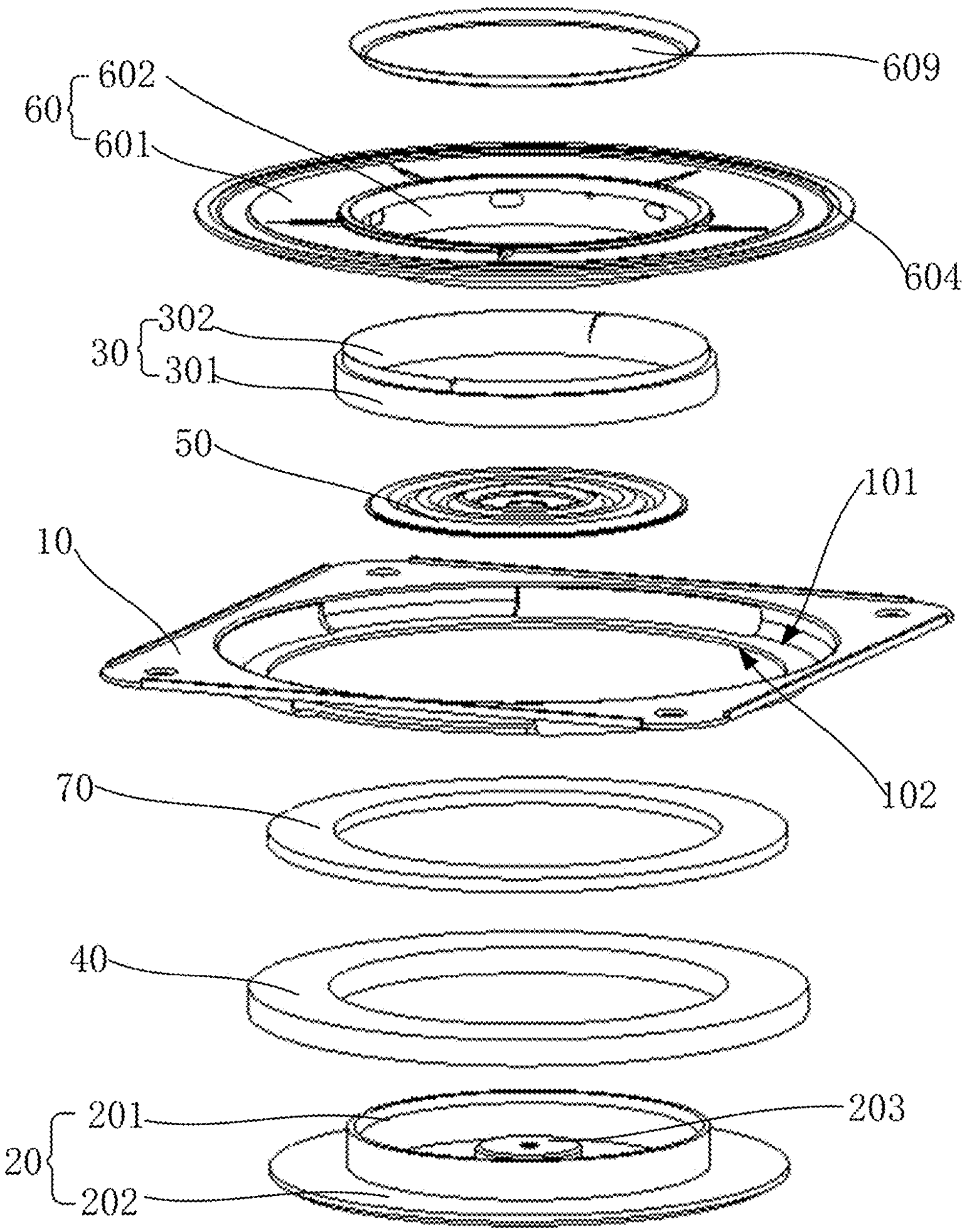
FIG. 3 is an exploded diagram 1 of a loudspeaker according to an embodiment of this application.

Refer to FIG. 2 and FIG. 3. In this embodiment, the loudspeaker 1 includes a basket 10 and a vibration diaphragm 60, and the basket 10 encloses a region to form a groove 101. The vibration diaphragm 60 covers the basket 10 to seal the groove 101. The vibration diaphragm 60 may be connected to the basket 10 by using assembly glue. Certainly, the vibration diaphragm 60 may alternatively be bolted to or clamped to the basket 10. Further, an annular elastic surround 604 may be disposed at an edge of the vibration diaphragm 60. The elastic surround 604 is disposed around the vibration diaphragm 60. An inner edge of the elastic surround 604 is connected to an outer edge of the vibration diaphragm 60, and an outer edge of the elastic surround 604 is connected to the basket 10. The vibration diaphragm 60 is connected to the basket 10 by using the elastic surround 604, so that resilience may be provided for the vibration diaphragm 60 when the vibration diaphragm 60 vibrates, and resistance that prevents the vibration diaphragm 60 from vibrating may also be reduced.

As shown in FIG. 2 and FIG. 3, in the foregoing embodiments, a material of the elastic surround 604 may include an elastic material such as sponge or rubber. Further, the elastic surround 604 may be in a wave shape or an arc shape to further improve elasticity of the elastic surround 604.

In this embodiment, the loudspeaker 1 further includes a yoke 20, a magnet 40, and a voice coil 30. A groove bottom of the groove 101 is provided with a fitting hole 102. The yoke 20 includes a bottom part 202 and a sleeve 201 located on the side of the bottom part 202. A central axis of the sleeve 201 is perpendicular to a plane on which the groove bottom of the groove 101 is located. A part of the sleeve 201 extends into the groove 101 through the fitting hole 102. Certainly, the sleeve 201 may alternatively be located outside the groove 101. A material of the sleeve 201 may include a ferromagnetic material such as steel or iron. The magnet 40 is annular. The magnet 40 is sleeved on the outer side of the sleeve 201. A material of the magnet 40 may include ferric oxide, neodymium magnet, alnico, and the like. An annular gap 204 is formed between an inner wall of the magnet 40 and an outer wall of the sleeve 201. The voice coil 30 is tubular. The voice coil 30 is sleeved on the outer side of the sleeve 201, and the voice coil 30 is located in the annular gap 204, so that the voice coil 30 is located in a magnetic field formed by the magnet 40.

For example, central axes of the sleeve 201, the magnet 40, and the voice coil 30 may be arranged in a collinear manner.

Further, the bottom part 202 of the yoke 20 may be in a plate shape. The sleeve 201 is disposed on a side that is of the bottom part 202 and that faces the vibration diaphragm 60. The sleeve 201 and the bottom part 202 may be an integral structure. Certainly, the sleeve 201 may be connected to the bottom part 202 in a manner of, for example, welding or bolting. Correspondingly, one end of the magnet 40 is attached to the side that is of the bottom part 202 and that faces the vibration diaphragm 60, and the magnet 40 may be connected to the bottom part 202 by using assembly glue.

An end face that is of the voice coil 30 and that faces the vibration diaphragm 60 is fixedly connected to a side that is of the vibration diaphragm 60 and that faces the bottom part 202, so as to implement connection between the voice coil 30 and the vibration diaphragm 60. Further, when the voice coil 30 is energized to vibrate, the vibration diaphragm 60 is driven to vibrate, and sound generation is achieved.

The voice coil 30 may include a tube body 302 and a coil 301 wound on an outer wall of the tube body 302, and correspondingly, the tube body 302 is sleeved on the sleeve 201. A material of the tube body 302 may include an insulating material such as plastic or insulating paper. Alternatively, a material of the tube body 302 is a metal material such as copper or aluminum. When the tube body 302 is made of a metal material, the coil 301 needs to be connected to the tube body 302 in an insulated manner. An end that is of the tube body 302 and that is close to the vibration diaphragm 60 is connected to the vibration diaphragm 60. For example, the tube body 302 may be connected to the vibration diaphragm 60 by using assembly glue. Certainly, the tube body 302 may alternatively be clamped to the vibration diaphragm 60. When the loudspeaker 1 works, the coil 301 is energized. Because the coil 301 is located in the magnetic field formed by the magnet 40, the coil 301 is subjected to a force, and therefore the vibration diaphragm 60 is driven by the tube body 302 to vibrate, so as to generate a sound.

Still refer to FIG. 2 and FIG. 3. In this embodiment, the loudspeaker 1 further includes a damper 50. The damper 50 is located in a region enclosed by the sleeve 201. The sleeve 201 encloses a tubular cavity. The damper 50 is arranged in the cavity. An outer edge of the damper 50 is connected to the voice coil 30, and a middle part of the damper 50 is connected to the yoke 20. The damper 50 has specific elasticity so as to enable, by using its own elastic force during operation, the voice coil 30 to perform reciprocating motion in the annular gap 204 along a direction parallel to the central axis of the sleeve 201. In addition, the damper 50 may further limit the position of the voice coil 30 in the annular gap 204. For example, a central axis of the damper 50 and the central axis of the sleeve 201 may be arranged in parallel. Further, the central axis of the damper 50 and the central axis of the sleeve 201 may be arranged in a collinear manner.

In the foregoing embodiment, the yoke 20 includes a boss 203. The boss 203 is disposed on the bottom part 202, and the boss 203 is located in the region enclosed by the sleeve 201. An inner wall that is of the damper 50 and that faces the bottom part 202 is connected to the boss 203. In such an arrangement, the damper 50 is connected to the bottom part 202 by using the boss 203, so that a distance between the damper 50 and the bottom part 202 can be increased, and the damper 50 can be located in a plane perpendicular to the central axis of the sleeve 201.

The damper 50 may be connected to the boss 203 by using assembly glue. For example, a hole may be disposed in the middle part of the damper 50, and a part of the boss 203 is inserted into the hole. Correspondingly, an inner edge of the damper 50 is connected to the boss 203 by using assembly glue. Certainly, the damper 50 may alternatively cover an end that is of the boss 203 and that is away from the bottom part 202, and be connected by using assembly glue to an end that is of the boss 203 and that is away from the bottom part 202. Therefore, the strength of the connection between the damper 50 and the boss 203 is improved.

According to the electronic device provided in this embodiment, the yoke 20 of the loudspeaker 1 includes the bottom part 202 and the sleeve 201 located on the side of the bottom part 202. The annular magnet 40 is sleeved on the outer side of the sleeve 201. The voice coil 30 is sleeved on the sleeve 201 and is located between the magnet 40 and the sleeve 201. The damper 50 is located in the region enclosed by the sleeve 201. The outer edge of the damper 50 is connected to the voice coil 30, and the middle part of the damper 50 is connected to the yoke 20. Both the magnet 40 and the voice coil 30 are located on the outer side of the damper 50. The volume of the magnet 40 and the length of the coil 301 in the voice coil 30 are not affected by the damper 50. The volume of the magnet 40 and the length of the coil 301 in the voice coil 30 can be set to be larger, so that an electromagnetic driving force that drives the voice coil 30 to vibrate is increased, and sensitivity of the loudspeaker 1 is improved.

In addition, as a requirement for miniaturization of an electronic device gradually increases, both the magnet 40 and the voice coil 30 are arranged on the outer side of the damper 50, so that the loudspeaker 1 can further have a robust electromagnetic driving force and robust sensitivity as well as a reduced thickness to facilitate ultra-thinning.

Still refer to FIG. 2 and FIG. 3. In some embodiments, the vibration diaphragm 60 includes a main body 601 and an extension part 602. The main body 601 is annular, and the extension part 602 is tubular. The extension part 602 extends from an inner edge of the main body 601 in a direction toward the bottom part 202. The outer edge of the damper 50 is fixedly connected to the interior of the extension part 602. In such an arrangement, the outer edge of the damper 50 is connected to the voice coil 30 by using the extension part 602. The extension part 602 may extend into the sleeve 201, so that the height of the boss 203 can be reduced, thereby reducing the mass of the loudspeaker 1.

For example, a central axis of the extension part 602 and a central axis of the voice coil 30 are arranged in parallel. Further, the central axis of the extension part 602 and the central axis of the voice coil 30 are arranged in a collinear manner. The damper 50 may be connected to an inner wall of the extension part 602 by using assembly glue.

Further, a dust cap 609 may be disposed on the main body 601, and the dust cap 609 may seal an inner edge of the main body 601.

Still refer to FIG. 2 and FIG. 3. In this embodiment, the loudspeaker 1 further includes a pole piece 70. The pole piece 70 is annular. The pole piece 70 covers a surface that is of the magnet 40 and that is away from the bottom part 202. The pole piece 70 may adjust a magnetic field generated by the magnet 40, so that magnetic field lines generated by the magnet 40 are concentrated between an inner edge of the pole piece 70 and the sleeve 201. The strength of a magnetic field in which the coil 301 is located is increased, the electromagnetic driving force that drives the voice coil 30 to move is increased, and the sensitivity of the loudspeaker 1 is thus improved. For example, a material of the pole piece 70 may include a ferromagnetic material such as iron or steel.

A central axis of the pole piece 70 and the central axis of the magnet 40 may be disposed in parallel. Further, the central axis of the pole piece 70 and the central axis of the magnet 40 are arranged in a collinear manner.

In the foregoing embodiment, an edge that is of the pole piece 70 and that faces the voice coil 30 protrudes from an edge that is of the magnet 40 and that faces the voice coil 30. In such an arrangement, a distance between the pole piece 70 and the sleeve 201 is less than a distance between the magnet 40 and the sleeve 201, to reduce a distance between an inner edge of the pole piece 70 and the coil 301, so that the strength of the magnetic field in which the coil 301 is located is further improved, and the electromagnetic driving force that drives the voice coil 30 to move is further improved. For example, in an embodiment in which both the pole piece 70 and the magnet 40 are annular, the centerline axis of the pole piece 70 and the center axis of the magnet 40 are arranged in a collinear manner, and the inner diameter of the pole piece 70 is less than the inner diameter of the magnet 40.

In some embodiments, the basket 10 is provided with a groove 101. The groove bottom of the groove 101 is provided with a fitting hole 102. At least a part of the voice coil 30 extends from the groove bottom of the groove 101 through the fitting hole 102. The size of the fitting hole 102 is properly set, so that a side wall of the fitting hole 102 is attached to an end face that is of the pole piece 70 and that is away from the voice coil 30. In other words, the pole piece 70 extends into the fitting hole 102 to limit a relative position between the pole piece 70 and the basket 10 by using the fitting hole 102, thereby improving position precision between the pole piece 70 and the basket 10.

Further, the pole piece 70 extends into the fitting hole 102, so that a part of the basket 10 may be attached to an end that is of the magnet 40 and that is away from the yoke 20, and the basket 10 and the end that is of the magnet 40 and that is away from the yoke 20 can be connected by using assembly glue, to achieve connection between the basket 10 and the magnet 40.

In this embodiment, an alignment hole 205 (not shown) may be disposed on the bottom part 202 of the yoke 20. The alignment hole 205 is located in the region enclosed by the sleeve 201, and the alignment hole 205 communicates with the sleeve 201. In a process of assembling the loudspeaker 1, a fixture may extend into the alignment hole 205, and the vibration diaphragm 60 and the yoke 20 may further be positioned by using the fixture, to facilitate assembly of the loudspeaker 1 and to improve assembly precision of the loudspeaker 1. Further, there may be multiple alignment holes 205. The multiple alignment holes 205 are disposed at spacings around the central axis of the sleeve 201, to facilitate positioning of the vibration diaphragm 60 and the yoke 20.

Scenario 2

Figure 4:
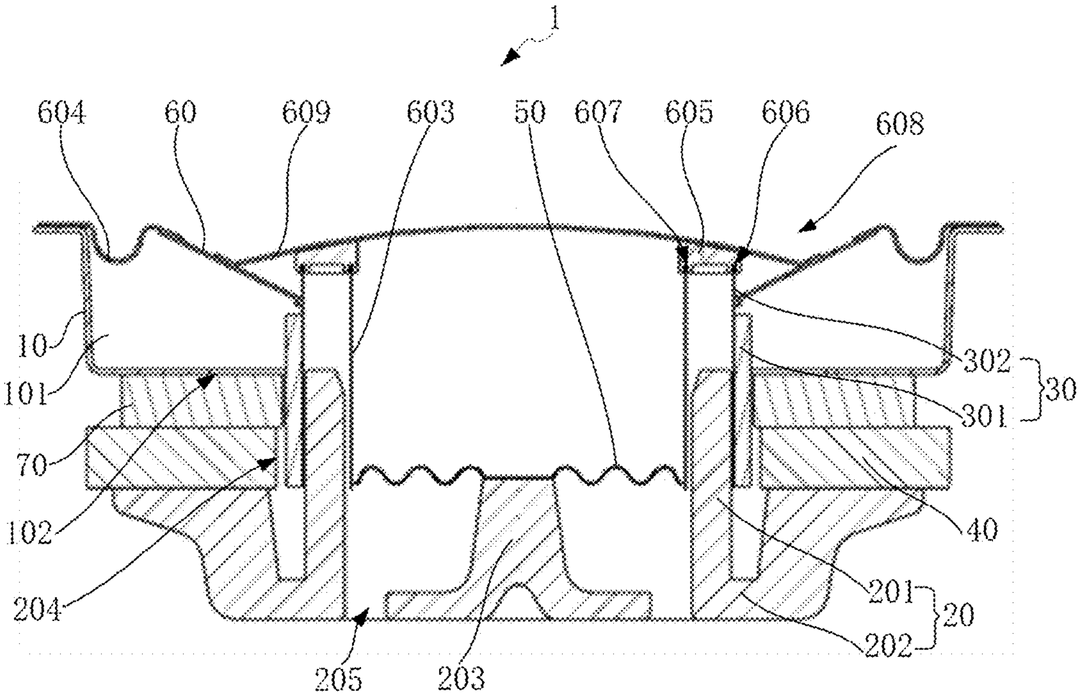
FIG. 4 is a schematic diagram 2 of a structure of a loudspeaker according to an embodiment of this application.

Refer to FIG. 4. In this embodiment, a loudspeaker 1 includes a basket 10 and a vibration diaphragm 60, and the basket 10 encloses a region to form a groove 101. The vibration diaphragm 60 covers the basket 10 to seal the groove 101. The vibration diaphragm 60 may be connected to the basket 10 by using assembly glue. Certainly, the vibration diaphragm 60 may alternatively be bolted to or clamped to the basket 10. Further, an annular elastic surround 604 may be disposed at an edge of the vibration diaphragm 60. The elastic surround 604 is disposed around the vibration diaphragm 60. An inner edge of the elastic surround 604 is connected to an outer edge of the vibration diaphragm 60, and an outer edge of the elastic surround 604 is connected to the basket 10. The vibration diaphragm 60 is connected to the basket 10 by using the elastic surround 604, so that resilience may be provided for the vibration diaphragm 60 when the vibration diaphragm 60 vibrates, and resistance that prevents the vibration diaphragm 60 from vibrating may also be reduced.

In this embodiment, the loudspeaker 1 further includes a yoke 20, a magnet 40, and a voice coil 30. A groove bottom of the groove 101 is provided with a fitting hole 102. The yoke 20 includes a bottom part and a sleeve 201 located on the side of the bottom part. A central axis of the sleeve 201 is perpendicular to a plane on which the groove bottom of the groove 101 is located. A part of the sleeve 201 extends into the groove 101 through the fitting hole 102. Certainly, the sleeve 201 may alternatively be located outside the groove 101. The magnet 40 is annular. The magnet 40 is sleeved on the outer side of the sleeve 201. An annular gap 204 is formed between an inner wall of the magnet 40 and an outer wall of the sleeve 201. The voice coil 30 is tubular. The voice coil 30 is sleeved on the outer side of the sleeve 201, and the voice coil 30 is located in the annular gap 204, so that the voice coil 30 is located in a magnetic field formed by the magnet 40.

Further, the bottom part 202 of the yoke 20 may be in a plate shape. The sleeve 201 is disposed on a side that is of the bottom part 202 and that faces the vibration diaphragm 60. The sleeve 201 and the bottom part 202 may be an integral structure. Certainly, the sleeve 201 may be connected to the bottom part 202 in a manner of, for example, welding or bolting. Correspondingly, one end of the magnet 40 is attached to the side that is of the bottom part 202 and that faces the vibration diaphragm 60, and the magnet 40 may be connected to the bottom part 202 by using assembly glue.

An end face that is of the voice coil 30 and that faces the vibration diaphragm 60 is fixedly connected to a side that is of the vibration diaphragm 60 and that faces the bottom part 202, so as to implement connection between the voice coil 30 and the vibration diaphragm 60. Further, when the voice coil 30 is energized to vibrate, the vibration diaphragm 60 is driven to vibrate, and sound generation is achieved.

The voice coil 30 may include a tube body 302 and a coil 301 wound on an outer wall of the tube body 302, and correspondingly, the tube body 302 is sleeved on the sleeve 201. A material of the tube body 302 may include an insulating material such as plastic or insulating paper. Alternatively, a material of the tube body 302 is a metal material such as copper or aluminum. When the tube body 302 is made of a metal material, the coil 301 needs to be connected to the tube body 302 in an insulated manner. An end that is of the tube body 302 and that is close to the vibration diaphragm 60 is connected to the vibration diaphragm 60. For example, the tube body 302 may be connected to the vibration diaphragm 60 by using assembly glue. Certainly, the tube body 302 may alternatively be clamped to the vibration diaphragm 60. When the loudspeaker 1 works, the coil 301 is energized. Because the coil 301 is located in the magnetic field formed by the magnet 40, the coil 301 is subjected to a force, and therefore the vibration diaphragm 60 is driven by the tube body 302 to vibrate, so as to generate a sound.

Still refer to FIG. 4. In this embodiment, the loudspeaker 1 further includes a damper 50. The damper 50 is located in a region enclosed by the sleeve 201. The sleeve 201 encloses a tubular cavity. The damper 50 is arranged in the cavity. An outer edge of the damper 50 is connected to the voice coil 30, and a middle part of the damper 50 is connected to the yoke 20. The damper 50 has specific elasticity so as to enable, by using its own elastic force during operation, the voice coil 30 to perform reciprocating motion in the annular gap 204 along a direction parallel to the central axis of the sleeve 201. In addition, the damper 50 may further limit the position of the voice coil 30 in the annular gap 204. For example, the central axis of the damper 50 and the central axis of the sleeve 201 may be disposed in parallel. Further, the central axis of the damper 50 and the central axis of the sleeve 201 may be arranged in a collinear manner.

In the foregoing embodiment, the yoke 20 includes a boss 203. The boss 203 is disposed on the bottom part 202, and the boss 203 is located in the region enclosed by the sleeve 201. An inner wall that is of the damper 50 and that faces the bottom part 202 is connected to the boss 203. In such an arrangement, the damper 50 is connected to the bottom part 202 by using the boss 203, so that a distance between the damper 50 and the bottom part 202 can be increased, and the damper 50 can be located in a plane perpendicular to the central axis of the sleeve 201.

The damper 50 may be connected to the boss 203 by using assembly glue. For example, a hole may be disposed in the middle part of the damper 50, and a part of the boss 203 is inserted into the hole. Correspondingly, an inner edge of the damper 50 is connected to the boss 203 by using assembly glue. Certainly, the damper 50 may alternatively cover an end that is of the boss 203 and that is away from the bottom part 202, and be connected by using assembly glue to an end that is of the boss 203 and that is away from the bottom part 202. Therefore, the strength of the connection between the damper 50 and the boss 203 is improved.

According to the electronic device provided in this embodiment, the yoke 20 of the loudspeaker 1 includes the bottom part 202 and the sleeve 201 located on the side of the bottom part 202. The annular magnet 40 is sleeved on the outer side of the sleeve 201. The voice coil 30 is sleeved on the sleeve 201 and is located between the magnet 40 and the sleeve 201. The damper 50 is located in the region enclosed by the sleeve 201. The outer edge of the damper 50 is connected to the voice coil 30, and the middle part of the damper 50 is connected to the yoke 20. Both the magnet 40 and the voice coil 30 are located on the outer side of the damper 50. The volume of the magnet 40 and the length of the coil 301 in the voice coil 30 are not affected by the damper 50. The volume of the magnet 40 and the length of the coil 301 in the voice coil 30 can be set to be larger, so that an electromagnetic driving force that drives the voice coil 30 to vibrate is increased, and sensitivity of the loudspeaker 1 is improved.

In addition, as a requirement for miniaturization of an electronic device gradually increases, both the magnet 40 and the voice coil 30 are arranged on the outer side of the damper 50, so that the loudspeaker 1 can further have robust electromagnetic driving force and robust sensitivity as well as a reduced thickness to facilitate ultra-thinning.

Still refer to FIG. 4. In some embodiments, the loudspeaker 1 further includes a support tube 603. The support tube 603 is located between the damper 50 and the voice coil 30, and is located in the region enclosed by the sleeve 201. An outer edge of the damper 50 is fixedly connected to an inner wall of the support tube 603. The support tube 603 is fixedly connected to the voice coil 30.

The support tube 603 may be directly connected to the voice coil 30, so that the support tube 603 is fastened to the voice coil 30. Certainly, the support tube 603 may alternatively be connected to the voice coil 30 by using a frame to implement indirect connection between the support tube 603 and the voice coil 30.

For example, both ends that are of the support tube 603 and the voice coil 30 and that are away from the bottom part 202 are fixedly connected to the vibration diaphragm 60, so that the support tube 603 is fastened to the voice coil 30 by using the vibration diaphragm 60. It should be noted that the support tube 603 and the voice coil 30 may be directly connected to the vibration diaphragm 60, so that the support tube 603 and the voice coil 30 are fastened to the vibration diaphragm 60. Certainly, the support tube 603 and the voice coil 30 may alternatively be connected to the vibration diaphragm 60 by using another component, so that the support tube 603 and the voice coil 30 are indirectly connected to the vibration diaphragm 60.

In this embodiment, the loudspeaker 1 further includes a dust cap 609. The dust cap 609 covers a top part of a sleeve region, and both the support tube 603 and the voice coil 30 are fixedly connected to an inner wall of the dust cap 609. The sleeve region is a columnar region enclosed by an outer wall of the sleeve 201, and the top part of the sleeve region is an end that is of the tubular region and that is away from the bottom part 202.

For example, a through hole facing the sleeve 201 is disposed on the vibration diaphragm 60. The dust cap 609 covers the vibration diaphragm 60 to seal the through hole. The outer edge of the vibration diaphragm 60 is connected to the basket 10. Correspondingly, both the voice coil 30 and the support tube 603 are connected to the vibration diaphragm 601.

Further, both the support tube 603 and the voice coil 30 may be directly connected to an inner wall of the dust cap 609, so that the support tube 603 and the voice coil 30 are directly connected to the dust cap 609. Certainly, the support tube 603 and the voice coil 30 may alternatively be indirectly connected to the inner wall of the dust cap 609 by using another component. This is not limited in this embodiment.

In the foregoing embodiment, a fastening ring 605 is disposed on an inner wall that is of the dust cap 609 and that faces the bottom part 202, and both the voice coil 30 and the support tube 603 are connected to the fastening ring 605. In such an arrangement, the voice coil 30 and the support tube 603 are connected to the dust cap 609 by using the fastening ring 605. Uniformity of a force on the dust cap 609 is improved. Moreover, connection between the voice coil 30 and the support tube 603 can be achieved by using the fastening ring 605.

The fastening ring 605 may be connected to the dust cap 609 by using assembly glue. Certainly, the fastening ring 605 may alternatively be connected to the dust cap 609 in a manner of, for example, clamping or bolting. This is not limited in this embodiment.

Still refer to FIG. 4. In some embodiments, the vibration diaphragm 601 may enclose a diffusion cavity 608 having an annular truncated cone shape. A central axis of the diffusion cavity 608 and a central axis of the sleeve 201 may be arranged in a collinear manner. Openings are provided at two ends of the diffusion cavity 608 in a direction of the central axis, where an opening with a smaller area is a through hole. The dust cap 609 is disposed in the diffusion cavity 608. The dust cap 609 is connected to a side wall of the diffusion cavity 608. Correspondingly, a side wall of the through hole is connected to the voice coil 30. In such an arrangement, the voice coil 30 is connected, by using the fastening ring 605, to the dust cap 609 and further to the vibration diaphragm 601. The strength of connection between the voice coil 30 and the vibration diaphragm 60 is improved, thereby preventing the voice coil 30 from being separated from the vibration diaphragm 60.

In an embodiment in which the voice coil 30 includes a tube body 302 and a coil 301 wound around the tube body 302, an end that is of the tube body 302 and that is away from the bottom part 202 is connected to the fastening ring 605, and a side wall of the through hole of the vibration diaphragm 601 is connected to a side wall of the tube body 302.

In the foregoing embodiment, a first annular groove 606 and a second annular groove 607 may be disposed on the fastening ring 605 at spacings. The diameter of the first annular groove 606 is less than the diameter of the second annular groove 607. Correspondingly, an end that is of the support tube 603 and that is away from the yoke 20 is inserted into the first annular groove 606, and an end that is of the tube body 302 and that is away from the yoke 20 is inserted into the second annular groove 607. In this way, the strength of connection between the support tube 603 and tube body 302 and the fastening ring 605 can be further improved.

Further, assembly glue may be disposed in the first annular groove 606, and then the support tube 603 is inserted into the first annular groove 606, so that connection between the support tube 603 and the fastening ring 605 is achieved. Similarly, assembly glue is disposed in the second annular groove 607, and then the tube body 302 is inserted into the second annular groove 607, so that connection between the tube body 302 and the fastening ring 605 is achieved.

According to the electronic device provided in this embodiment, the yoke 20 of the loudspeaker 1 includes the bottom part 202 and the sleeve 201 located on the side of the bottom part 202. The annular magnet 40 is sleeved on the outer side of the sleeve 201. The voice coil 30 is sleeved on the sleeve 201 and is located between the magnet 40 and the sleeve 201. The damper 50 is located in the region enclosed by the sleeve 201. The outer edge of the damper 50 is connected to the voice coil 30, and the middle part of the damper 50 is connected to the yoke 20. Both the magnet 40 and the voice coil 30 are located on the outer side of the damper 50. The volume of the magnet 40 and the length of the coil 301 in the voice coil 30 are not affected by the damper 50. The volume of the magnet 40 and the length of the coil 301 in the voice coil 30 can be set to be larger, so that an electromagnetic driving force that drives the voice coil 30 to vibrate is increased, and sensitivity of the loudspeaker 1 is improved.

In addition, as a requirement for miniaturization of an electronic device gradually increases, both the magnet 40 and the voice coil 30 are arranged on the outer side of the damper 50, so that the loudspeaker 1 can further have robust electromagnetic driving force and robust sensitivity as well as a reduced thickness to facilitate ultra-thinning.

Still refer to FIG. 4. In this embodiment, the loudspeaker 1 further includes a pole piece 70. The pole piece 70 is annular. The pole piece 70 covers a surface that is of the magnet 40 and that is away from the bottom part 202. The pole piece 70 may adjust a magnetic field generated by the magnet 40, so that magnetic field lines generated by the magnet 40 are concentrated between an inner wall of the pole piece 70 and the sleeve 201. The strength of a magnetic field in which the coil 301 is located is increased, the electromagnetic driving force that drives the voice coil 30 to move is increased, and the sensitivity of the loudspeaker 1 is thus improved. For example, a material of the pole piece 70 may include a ferromagnetic material such as iron or steel.

Further, a central axis of the pole piece 70 and the central axis of the magnet 40 are arranged in a collinear manner. Moreover, an edge that is of the pole piece 70 and that faces the voice coil 30 protrudes from an edge that is of the magnet 40 and that faces the voice coil. In such an arrangement, a distance between the pole piece 70 and the sleeve 201 is less than a distance between the magnet 40 and the sleeve 201, to reduce a distance between an inner wall of the pole piece 70 and the coil 301, so that the strength of the magnetic field in which the coil 301 is located is further improved, and the electromagnetic driving force that drives the voice coil 30 to move is further improved.

In some embodiments, the basket 10 is provided with a groove 101. The groove bottom of the groove 101 is provided with a fitting hole 102. At least a part of the voice coil 30 extends from the groove bottom of the groove 101 through the fitting hole 102. The basket 10 may be connected, by using assembly glue or riveting, to a surface that is of the pole piece 70 and that is away from the bottom part 202. In such an arrangement, a connection area between the basket 10 and the pole piece 70 is relatively large, thereby improving a connection force between the basket 10 and the pole piece 70.

Figure 7:
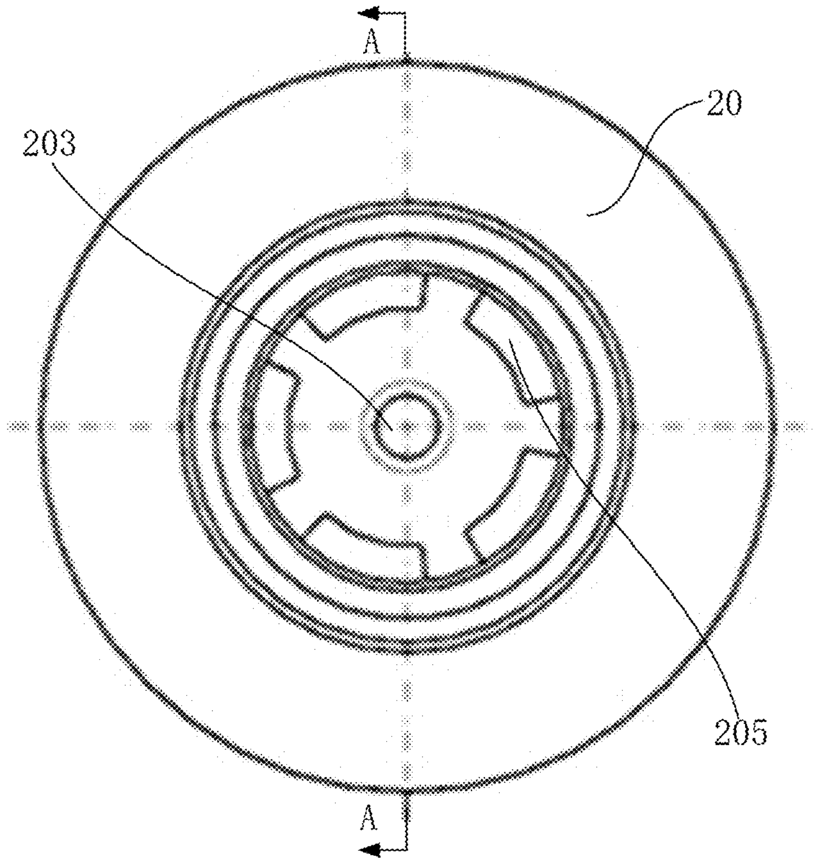
FIG. 7 is a schematic diagram of a structure of a yoke in a loudspeaker according to an embodiment of this application.
Figure 8:
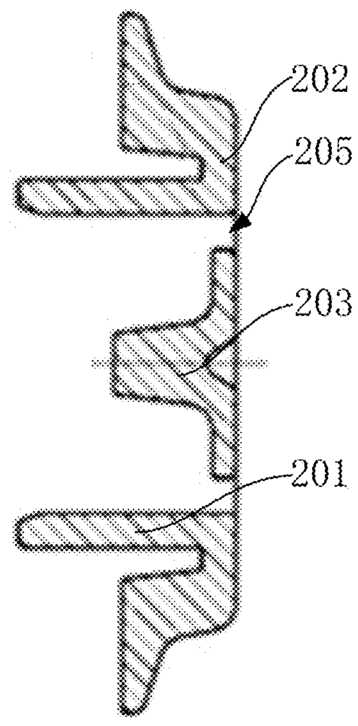
FIG. 8 is a sectional view taken in the direction A-A of FIG. 7.

Still refer to FIG. 4, FIG. 7, and FIG. 8. In this embodiment, an alignment hole 205 may be disposed on the bottom part 202 of the yoke 20. The alignment hole 205 is located in the region enclosed by the sleeve 201, and the alignment hole 205 communicates with the sleeve 201. In a process of assembling the loudspeaker 1, a fixture may extend into the alignment hole 205, and further, the vibration diaphragm 60 and the yoke 20 may be positioned by using the fixture to facilitate assembly of the loudspeaker 1 and to improve assembly precision of the loudspeaker 1. Further, there may be multiple alignment holes 205. The multiple alignment holes 205 are disposed at spacings around the central axis of the sleeve 201, to facilitate positioning of the vibration diaphragm 60 and the yoke 20.

Scenario 3

Figure 5:
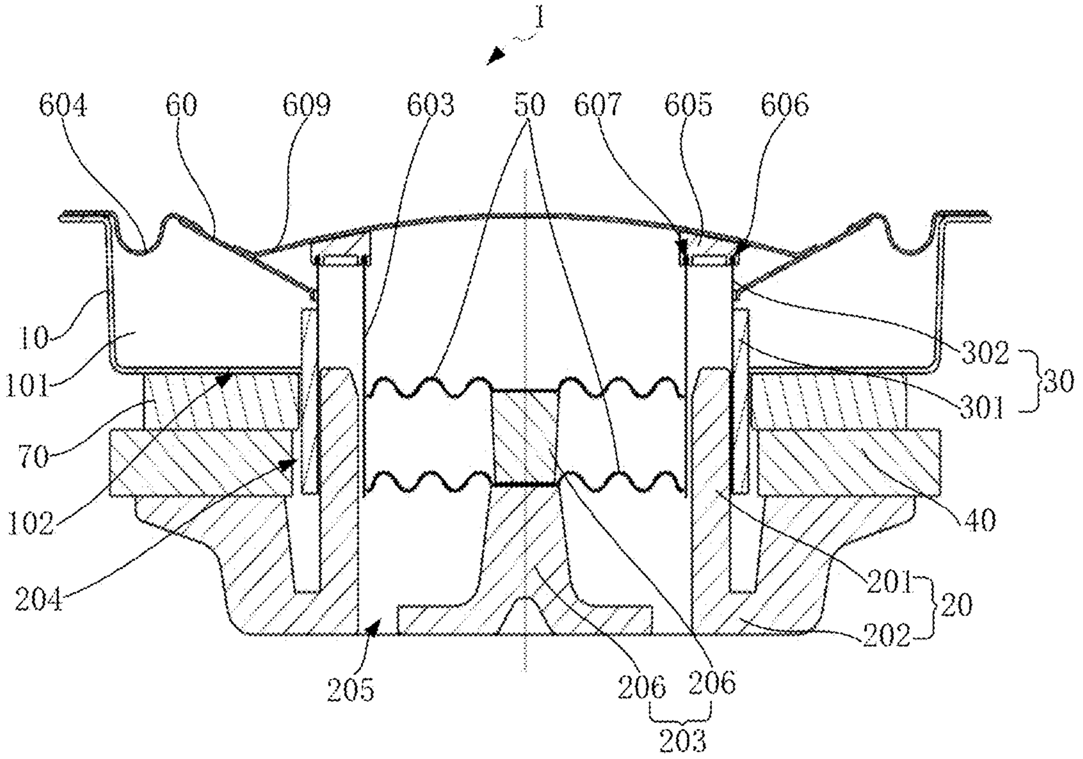
FIG. 5 is a schematic diagram 3 of a structure of a loudspeaker according to an embodiment of this application.
Figure 6:
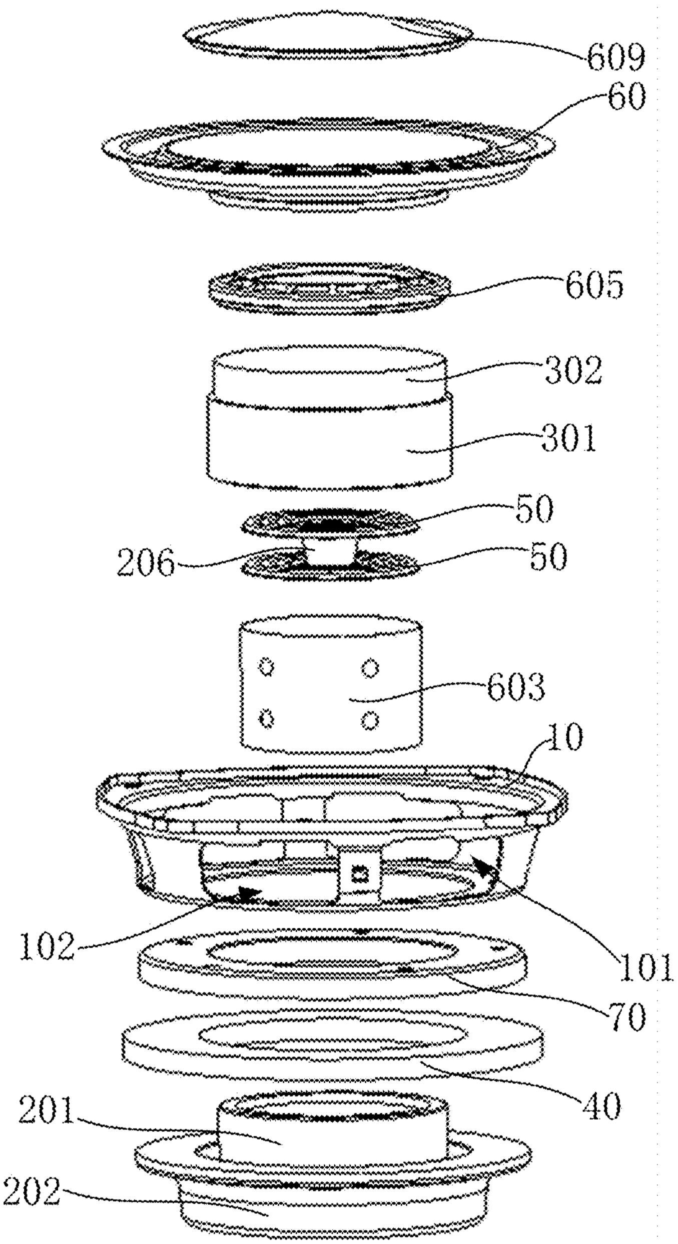
FIG. 6 is an exploded diagram 2 of a loudspeaker according to an embodiment of this application.

Refer to FIG. 5 and FIG. 6. A difference between this embodiment and scenario 2 lies in that there may be multiple dampers 50. The multiple dampers 50 are stacked in a direction of a central axis of a sleeve 201. Every two adjacent dampers 50 are separated from each other. In other words, the multiple dampers 50 are arranged in parallel and at spacings. In such an arrangement, the multiple dampers 50 can improve resilience of a voice coil 30 and further limit a position of the voice coil 30 in an annular gap 204.

Further, a boss 203 includes a plurality of fastening portions 206. The plurality of fastening portions 206 are sequentially disposed along the direction of the central axis of the sleeve 201. Each damper 50 is fastened to one fastening portion 206. Such an arrangement allows each damper 50 to be in a plane perpendicular to the central axis of the sleeve 201. For example, there may be two, three, four fastening portions 206, or the like. Correspondingly, the quantity of the dampers 50 is the same as the quantity of the fastening portions 206.

In some embodiments, in the plurality of fastening portions 206, a fastening portion 206 close to the bottom part 202 and the bottom part 202 may be an integrated structure. Two adjacent fastening portions 206 in other fastening portions 206 may be connected by assembly glue. Alternatively, in the plurality of fastening portions 206, a fastening portion 206 close to the bottom part 202 and the bottom part 202 may be an integrated structure, and a threaded hole for connection is disposed on the fastening portion 206 close to the bottom part 202. Correspondingly, a mounting hole is disposed on each of the other fastening portions 206. A connection bolt sequentially passes through mounting holes of the fastening portions 206 and is engaged with the threaded hole for connection to connect the fastening portions 206 together.

In two adjacent fastening portions 206, a fastening portion 206 away from the bottom part 202 does not completely cover the fastening portion 206 close to the bottom part 202. In other words, a mounting position is reserved on an end face that is away from the bottom part 202 and that is of the fastening portion 206 close to the bottom part 202. The damper 50 may cover the mounting position to facilitate the mounting of the damper 50. Certainly, the damper 50 may alternatively be sandwiched between two adjacent fastening portions 206, to improve the strength of connection between the damper 50 and the fastening portion 206.

In another embodiment, the plurality of fastening portions 206 may be an integrated structure. Correspondingly, in two adjacent fastening portions 206, a fastening portion 206 away from the bottom part 202 does not completely cover the fastening portion 206 close to the bottom part 202, so that a mounting position is reserved on an end face that is away from the bottom part 202 and that is of the fastening portion 206 close to the bottom part 202. The damper 50 covers the mounting position to facilitate the mounting of the damper 50.

In the descriptions of this application, it should be understood that directions or position relationships indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", and the like are based on the accompanying drawings, are merely used for the convenience of describing this application and simplifying the description, but are not intended to indicate or imply that an apparatus or element referred to needs to have a particular orientation or needs to be constructed and operated in a particular orientation, and therefore cannot be understood as a limitation on this application.

It should be noted that, in the descriptions of this application, the terms "first" and "second" are merely used to facilitate description of different components, and should not be understood as an indication or implication of a sequence relationship or relative importance, or an implicit indication of a quantity of indicated technical features. Therefore, a feature limited by "first" or "second" may explicitly or implicitly include at least one of the features.

In this application, unless otherwise specified, the terms such as "mounting", "connecting", "connection", and "fastening" should be understood in a broad sense, for example, may be understood as fixed connection, detachable connection, or integration, or may be understood as mechanical connection, electrical connection, or mutual communication, or may be understood as direct connection, or indirect connection through a medium, or internal communication of two elements or a mutual relationship between two elements, unless otherwise specified. A person of ordinary skill in the art may understand specific meanings of the terms in this application according to specific cases.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A loudspeaker, comprising:
- a yoke;
- a magnet;
- a vibration diaphragm;
- a voice coil; and
- a damper,
- wherein the yoke comprises a bottom part and a sleeve located on a side of the bottom part,
- wherein the magnet is annular, and the magnet is sleeved on an outer side of the sleeve,
- wherein the voice coil is sleeved on the outer side of the sleeve and is located between the sleeve and the magnet,
- wherein an end face that is of the voice coil and that faces the vibration diaphragm is fixedly coupled to a side that is of the vibration diaphragm and that faces the bottom part,
- wherein the vibration diaphragm includes a main body and an extension part, the main body is annular, the extension part is tubular, the extension part extends from an inner edge of the main body in a direction toward the bottom part, and an outer edge of the damper is fixedly coupled to an inner wall of the extension part, and
- wherein the damper is located in a region enclosed by the sleeve.

2. The loudspeaker according to claim 1, wherein the yoke further comprises a boss; the boss is located in the region enclosed by the sleeve; and a middle part of the damper is attached to a surface that is of the boss and that is away from the bottom part.

3. The loudspeaker according to claim 1, wherein the loudspeaker further comprises a support tube, the support tube is located between the damper and the voice coil, and is located in the region enclosed by the sleeve, an outer edge of the damper is fixedly connected to an inner side wall of the support tube, and the support tube is fixedly connected to the voice coil.

4. The loudspeaker according to claim 3, wherein both ends that are of the support tube and the voice coil and that are away from the bottom part are fixedly connected to the vibration diaphragm.

5. The loudspeaker according to claim 3, wherein the loudspeaker further comprises a dust cap, the dust cap covers a top part of a sleeve region, and both the support tube and the voice coil are fixedly connected to an inner wall of the dust cap.

6. The loudspeaker according to claim 5, wherein the inner wall of the dust cap is provided with a fastening ring, and both the support tube and the voice coil are connected to the fastening ring.

7. The loudspeaker according to claim 1, wherein the loudspeaker further comprises a pole piece, the pole piece is annular, and the pole piece covers a surface that is of the magnet and that is away from the bottom part.

8. The loudspeaker according to claim 7, wherein an edge that is of the pole piece and that faces the voice coil protrudes from an edge that is of the magnet and that faces the voice coil.

9. The loudspeaker according to claim 7, wherein the loudspeaker further comprises a basket, the basket is provided with a groove, a groove bottom of the groove is provided with a fitting hole; and at least a part of the voice coil extends from the groove bottom of the groove through the fitting hole.

10. The loudspeaker according to claim 9, wherein an edge of the fitting hole is attached to an end face that is of the pole piece and that is away from the voice coil.

11. The loudspeaker according to claim 1, comprising a plurality of dampers, the plurality of dampers are stacked along a direction of a central axis of the sleeve, and every two adjacent dampers are separated from each other.

12. The loudspeaker according to claim 11, wherein a boss is provided with a plurality of fastening portions along a direction of a central axis of the sleeve, and each damper is fastened to one fastening portion.

13. An electronic device, comprising:
- a housing; and
- a loudspeaker,
- wherein the loudspeaker is located inside the housing,
- wherein the loudspeaker comprises a yoke, a magnet, a voice coil, and a damper,
- wherein the yoke comprises a bottom part and a sleeve located on a side of the bottom part,
- wherein the magnet is annular, and the magnet is sleeved on an outer side of the sleeve,
- wherein the voice coil is sleeved on the outer side of the sleeve and is located between the sleeve and the magnet,
- wherein the loudspeaker further comprises a vibration diaphragm, and an end face that is of the voice coil and that faces the vibration diaphragm is fixedly coupled to a side that is of the vibration diaphragm and that faces the bottom part,
- wherein the vibration diaphragm comprises a main body and an extension part, the main body is annular, the extension part is tubular, the extension part extends from an inner edge of the main body in a direction toward the bottom part, and an outer edge of the damper is fixedly coupled to an inner wall of the extension part, and
- wherein the damper is located in a region enclosed by the sleeve.

14. The electronic device according to claim 13, wherein the yoke further comprises a boss; the boss is located in the region enclosed by the sleeve; and a middle part of the damper is attached to a surface that is of the boss and that is away from the bottom part.

15. The electronic device according to claim 13, wherein the loudspeaker further comprises a support tube, the support tube is located between the damper and the voice coil, and is located in the region enclosed by the sleeve, an outer edge of the damper is fixedly connected to an inner side wall of the support tube, and the support tube is fixedly connected to the voice coil.

16. The electronic device according to claim 15, wherein both ends that are of the support tube and the voice coil and that are away from the bottom part are fixedly connected to the vibration diaphragm.

* * * * *